US008788708B2

United States Patent
Li (10) Patent No.: US 8,788,708 B2
(45) Date of Patent: Jul. 22, 2014

(54) SPLIT-DOMAIN NAME SERVICE (75) Inventor: Qing Li, Cupertino, CA (US)

(73) Assignee: Blue Coat Systems, Inc., Sunnyvale, CA (US)

(*) Notice: Subject to any disclaimer, the term of this patent is extended or adjusted under 35 U.S.C. 154(b) by 274 days.

(21) Appl. No.: 13/345,081

(22) Filed: Jan. 6, 2012

(65) Prior Publication Data
US 2013/0179551 A1 Jul. 11, 2013

(51) Int. Cl.
*G06F 15/16* (2006.01)
(52) U.S. Cl.
USPC ............ 709/245; 709/203; 709/223; 709/227
(58) Field of Classification Search
USPC .......................... 709/203, 223, 224, 227, 245
See application file for complete search history.

(56) References Cited

U.S. PATENT DOCUMENTS

| | | | |
|---|---|---|---|
| 7,895,319 B2 * | 2/2011 | Statia et al. | 709/245 |
| 2003/0154306 A1 * | 8/2003 | Perry | 709/245 |
| 2005/0066041 A1 * | 3/2005 | Chin et al. | 709/228 |
| 2007/0094411 A1 * | 4/2007 | Mullane et al. | 709/245 |
| 2007/0214232 A1 * | 9/2007 | Belimpasakis et al. | 709/217 |
| 2009/0006119 A1 * | 1/2009 | Langshur et al. | 705/1 |
| 2013/0111040 A1 * | 5/2013 | Vempati et al. | 709/227 |
| 2013/0179551 A1 * | 7/2013 | Li | 709/223 |

* cited by examiner

*Primary Examiner* — Ramy M Osman
(74) *Attorney, Agent, or Firm* — Baker Botts L.L.P.

(57) ABSTRACT

In one embodiment, a method includes receiving an address of a DNS server of a network. A secure communication tunnel is established with a client of the network. The client is notified that requests to the address of the DNS server of the network should not pass through the secure communication tunnel. A request for a DNS lookup of a name of a host of the network is received through the secure communication tunnel. A DNS referral that includes the address of the DNS server of the network is sent to the client.

20 Claims, 3 Drawing Sheets

SPLIT-DOMAIN NAME SERVICE

TECHNICAL FIELD

This disclosure generally relates to domain name service (DNS) lookups in communications networking.

BACKGROUND

The Domain Name System (DNS) is a hierarchical distributed naming system for resources (such as computing devices) connected to one or more networks (such as the Internet or a private network). The DNS associates various information with domain names assigned to each of the resources. For example, the DNS translates domain names that are meaningful to humans into numerical identifiers associated with networking equipments (e.g., Internet Protocol (IP) addresses) for the purpose of locating and addressing these resources worldwide. The DNS makes it possible to assign domain names to groups of resources in a meaningful way, independent of each resource's physical location. Because of this, World Wide Web (WWW) hyperlinks and Internet contact information can remain consistent even if routing arrangements change.

DESCRIPTION OF EXAMPLE EMBODIMENTS

Figure 1:
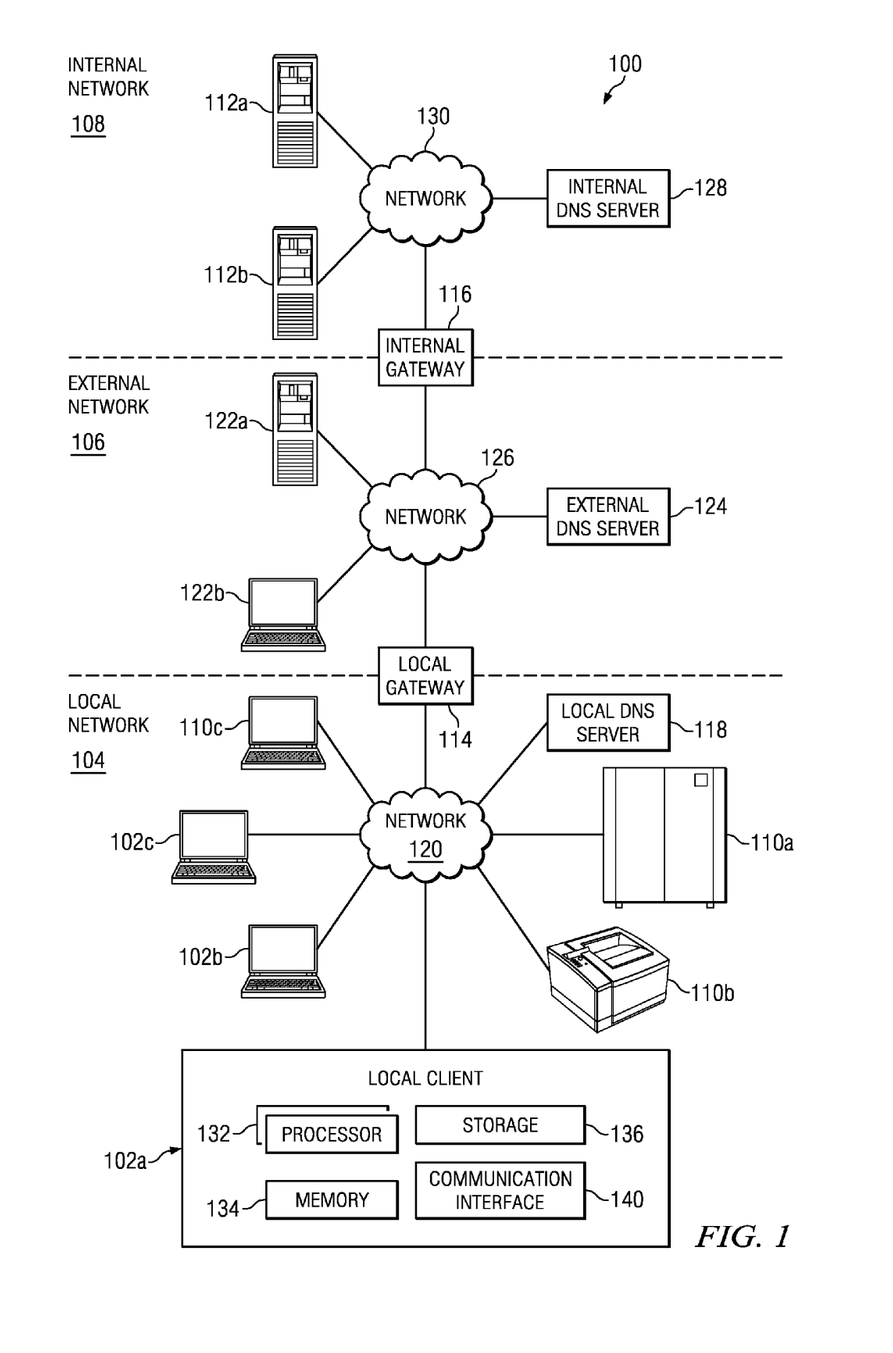
FIG. 1 illustrates an example system for providing split-domain name service to clients of an example network.

FIG. 1 illustrates an example system 100 for providing split-domain name service to local clients 102 of an example local network 104. In the example of FIG. 1, system 100 includes local network 104, external network 106, and internal network 108. These networks may be coupled together by one or more gateways. For example, local network 104 and external network 106 are coupled through local gateway 114 that is a member of both local network 104 and external network 106. As another example, external network 106 is coupled to internal network 108 through internal gateway 116 that is a member of both external network 106 and internal network 108. In other embodiments, any suitable number of gateways may couple external network 106 to internal network 108 or local network 104.

In the embodiment depicted, local network 104 includes local gateway 114, local clients 102, hosts 110, and local domain name service (DNS) server 118 coupled together through network 120. External network 106 includes local gateway 114, internal gateway 116, external hosts 122, and external DNS server 124 coupled together through network 126. Internal network 108 includes internal gateway 116, internal hosts 112, and internal DNS server 128 coupled together through network 130.

Local clients 102 of local network 104 are operable to communicate with hosts 110 of local network 104, hosts 112 of internal network 108, and hosts 122 of external network 106 to access services, applications, or other resources provided by these hosts. In order to communicate with a particular host, local client 102 sends a message to an address (e.g., an Internet Protocol (IP) address) of the host. The message is directed (e.g., routed) to the host according to the address. In some situations, local client 102 does not initially know the address of the host, but may know a name (e.g., a fully qualified domain name (FQDN)) of the host. For example, a user associated with local client 102 may enter the name of the host into a web browser or an application may store the name but not the address of the host. In such situations, local client 102 may request a DNS lookup of the host by sending the name of the host in a DNS query to a DNS server. If the DNS server includes an entry that maps the name of the host to the address of the host, it provides the address of the host to local client 102. If the DNS server does not include such an entry, it may begin an iterative or recursive process through which the address is eventually obtained or it is determined that the name of the host is unresolvable (i.e., a mapping of the name to the address cannot be found). This process may involve communication with one or more other DNS servers. In some situations, the DNS server may not have an entry that maps the name of the host to its address, but it may be operable to provide a hint describing another DNS server for the local client 102 to query. For example, the initially queried DNS server may send a DNS referral message that includes an address of a different DNS server that local client 102 may communicate with to obtain the address. Local client 102 may then send the DNS query to the referred DNS server. The referred DNS server may provide the address, notify local client 102 that the host's name is unresolvable, or send another DNS referral message to local client 102. This process may repeat until local client 102 receives an address of the host from a DNS server or determines that the host's name is unresolvable.

Some private networks (such as local network 104 and internal network 108) may include hosts with names that are resolvable (i.e., an address corresponding to the host's name is returned) only in particular situations. For example, addresses may only be provided for particular hosts of these private networks if DNS lookup requests for these hosts are received from within the respective private network or from an authenticated user. Accordingly, entries mapping the names of such hosts to addresses of the hosts may be stored on one or more DNS servers of the private network and provided in response to DNS lookup requests meeting certain conditions, but not provided in response to other DNS lookup requests (such as those from the general public) that do not satisfy these conditions.

As an example, an organization may include one or more hosts (such as web servers) that have addresses associated with a host name "www.exampleorganization.com". While this host name may be resolvable from a public network such as the Internet, the network of the organization may also include one or more host names that are only resolvable from within a private network of the organization. For example, an accounting department of the organization may be serviced by one or more hosts that have the hostname "www.accounting.exampleorg.com". For security purposes, the organization may desire to keep the addresses of these hosts private. Accordingly, the organization may have one or more DNS servers that are operable to resolve the name "www.accounting.exampleorg.com", but only if the DNS lookup request including the name is received from inside the organization's network or other authorized source.

Such a scheme may be problematic for clients that attempt to simultaneously communicate with hosts of two different private networks (such as local network 104 and internal network 108). For example, some clients run software that do not allow them to send initial DNS lookup requests to more than one DNS server (or group of DNS servers having the same address). An initial DNS lookup request is the first DNS lookup request that includes a particular host name for which the client is seeking an address (as opposed to a later DNS lookup request including the same host name to a different DNS server based on a DNS referral or a DNS lookup request made based on cached data of the client). Such clients are configured to send all initial DNS lookup requests to the same DNS server. This may create problems when the client is coupled to two private networks simultaneously (e.g., the client may be a member of local network 104 and have a Virtual Private Network (VPN) tunnel established with internal network 108). If the client is configured to send all initial DNS lookup requests to a DNS server of the first private network (e.g. internal DNS server 128), the DNS server of the first private network may be able to resolve host names of hosts of the first private network but incapable of resolving host names of hosts of the second private network (e.g. local network 104). For example, if the DNS server of the first private network does not include an entry with a name to address mapping for the requested host, the DNS server generally submits a series of queries to publicly available DNS servers (e.g., external DNS servers 124) to resolve the name of the host. However, since the host referenced in the queries is a member of a private network, the host name may not be resolvable through the publicly available DNS servers. Thus, in order to resolve the host name, the client would have to submit a DNS lookup request to a DNS server of the second private network (e.g., local DNS server 118). However, if the client is thereafter configured to send all initial DNS lookup requests to the DNS server of the second private network instead of the DNS server of the first private network, the client may encounter a similar problem when attempting to communicate with hosts of the first private network.

Particular embodiments of the present disclosure enable split-domain name service by providing internal DNS server 128 that is operable to resolve host names of hosts 112 of internal network 108 and provide DNS referrals for host names of hosts 110 of local network 104. After receiving a DNS referral, local client 102 may send an additional DNS lookup request to local DNS server 118 to resolve the host name of the host 110. Accordingly, local client 102 may configure internal DNS server 128 as the DNS server to which it sends all initial DNS lookup requests while maintaining the ability to communicate with hosts 110 of local network 104 and hosts 112 of internal network 108. In addition, internal DNS server 128 may be operable to resolve hostnames of hosts 122 of external network 106, thus allowing local client 102 to obtain addresses of hosts of all three networks depicted in FIG. 1 while configured to send all initial DNS queries to internal DNS server 128. The components that enable this split-domain name service are now described in greater detail.

Internal network 108 represents a private network of an organization, such as a corporation, government, cloud-based computing service provider, or other entity. In particular embodiments, internal network 108 is owned and/or controlled by the organization and access to internal network 108 is controlled by the organization. As an example, internal network 108 may include an enterprise network that is accessed by employees of the enterprise or a cloud-based service network that is accessed by customers that use the cloud-based services. Internal network 108 includes any suitable number of interconnected hosts 112, networks 130, internal DNS servers 128, and internal gateways 116.

Host 112 of internal network 108 may be a computing device such as a server, network component, personal computer, mobile device, storage device, or other appropriate computing device. Host 112 may include any collection of hardware, software, memory, and/or controlling instructions or logic operable to provide applications, services, or other resources to clients 102. Host 112 may be identified by one or more names (such as an FQDN) and one or more addresses (such as an IP address).

Internal network 108 may further include one or more internal DNS servers 128. Internal DNS server 128 may include any collection of hardware, software, memory, and/or controlling instructions or logic operable to receive DNS lookup requests and provide responses to these requests. For example, internal DNS server 128 may receive DNS lookup requests for addresses of hosts 112, 122, or 110. Internal DNS server 128 may provide any suitable responses to such lookup requests. As examples, internal DNS server 128 may respond with an address of the host, a DNS referral with an address of a different DNS server, or an indication that the name specified in the DNS lookup request is unresolvable.

In particular embodiments, internal DNS server 128 includes authoritative or cached name to address mappings for one or more hosts 112 of internal network 108 and cached name to address mappings for one or more hosts 122 of external network 106. Accordingly, internal DNS server 128 may be operable to return addresses of one or more of these hosts in response to DNS lookup requests. Internal DNS server 128 may also be operable to query other internal DNS servers 128 or external DNS servers 124 to obtain addresses of hosts of internal network 108 or external network 106 respectively.

Internal DNS server 128 may also include a mapping of one or more domains of local network 104 to an address of local DNS server 118. For example, "www.exampleorg.com" may be mapped to the address of local DNS server 118. When internal DNS server 128 receives a DNS lookup request from local client 102 that includes a host name that is a member of this domain (e.g., the host name may include exampleorg-.com), internal DNS server 128 may respond with the address of local DNS server 118 as a referral. Internal DNS server 128 may obtain the domain name and the associated address of local DNS server 118 in any suitable manner. For example, an individual (e.g., a network administrator) associated with local network 104 may provide the information to an individual (e.g., another network administrator) associated with internal network 108. As another example, local client 102 may provide this information to internal gateway 116 and internal DNS server 128 when establishing a secure communication tunnel with internal gateway 116 (e.g., during VPN session establishment). This method allows dynamic updating of this information without requiring manual configuration of internal gateway 116 and/or internal DNS server 128 by administrators of internal network 108. As yet another example, internal DNS server 128 may obtain this information via a reverse DNS lookup performed on the address of local client 102. In such embodiments, the reverse DNS lookup may yield information such as the type of physical connection used by local client 102 (e.g., DSL or cable), the Internet Service Provider (ISP) of local client 102, and the nature of the IP address of local client 102 (e.g., static or obtained through Dynamic Host Configuration Protocol (DHCP)). Some or all of this information may be used in conjunction with information provided by one or more ISPs to determine the address of local DNS server 118 (which may be a DNS server controlled by an ISP) and which host names should be mapped to the address of local DNS server 118.

This method may be especially useful when local client 102 connects remotely to network 120 of local network 104 using a VPN connection.

In particular embodiments, internal network 108 may include multiple internal DNS servers 128 and internal gateways 116 that are geographically distributed. Local client 102 may be assigned to a particular DNS server 128 based on the location of the internal gateway 116 through which local client 102 accesses internal network 108. In embodiments with multiple internal DNS servers 128, internal DNS servers 128 may communicate with each other to synchronize information regarding the mapping of host names of local network 104 to addresses of local DNS server 118. For example, such information may be contained within a DNS zone file that is distributed to each internal DNS server 128. The DNS zone file may be transferred using any suitable mechanism, such as Berkeley Internet Name Daemon 9 (BIND9) software running on the internal DNS servers 128.

Network 130 of internal network 108 represents any suitable network operable to facilitate communication between the components of internal network 108, such as internal gateway 116, internal DNS servers 128, and hosts 112. Network 130 may include any interconnecting system capable of transmitting audio, video, signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computing system network, such as the Internet, a wireline or wireless network, an enterprise intranet, or any other suitable communication link, including combinations thereof, operable to facilitate communication between the components of internal network 108.

Internal network 108 may also include any suitable number of internal gateways 116. For example, some embodiments include multiple internal gateways 116 that each provide access to internal network 108. These internal gateways 116 may be geographically distributed to provide redundancy, high availability, and optimal paths to internal network 108. Internal gateway 116 may include any collection of hardware, software, memory, and/or controlling instructions or logic operable to provide secure access to internal network 108. In particular embodiments, internal gateway 116 is a VPN gateway or an access point of a cloud-based service. In particular embodiments, internal gateway 116 may receive a request from a local client 102 to establish a secure communication tunnel (e.g., a VPN tunnel). After authenticating (e.g., via a password or other method) and authorizing the local client 102 (e.g., determining what hosts 112 of internal network 108 the local client 102 is allowed to access), internal gateway 116 establishes a secure communication tunnel with local client 102. The secure communication tunnel may be established using any suitable protocol, such as Internet Protocol Security (IPsec) or Secure Sockets Layer (SSL).

In particular embodiments, communication that travels through the secure communication tunnel is encrypted. Internal gateway 116 may receive encrypted communications from local client 102 through the secure communication tunnel, decrypt these communications, and forward them towards the destination host 112 or internal DNS server 128 of internal network 108. Internal gateway 116 may also receive communications from a host 112 or internal DNS server 128, encrypt these communications, and send the encrypted communications to local client 102 across the secure communication tunnel. In particular embodiments, internal gateway 116 performs protocol conversion. As an example, internal gateway 116 may encapsulate link layer traffic used by internal network 108 within internet layer traffic that is sent to external network 106 or local network 104 or decapsulate internet layer traffic received from external network 106 or local network 104 into link layer traffic and forward the link layer traffic to a component of internal network 108.

In various embodiments, local client 102 may utilize split-VPN or a similar method such that a portion of traffic sent from local client 102 (e.g., to hosts 110 or 122) does not flow through the secure communication tunnel established with internal gateway 116 while the remainder of the traffic does. During the establishment of the secure communication tunnel between internal gateway 116 and local client 102, internal gateway 116 may send the address of local DNS server 118 (or an address prefix that includes the address of local DNS server 118) with an indication that traffic sent to the address (or prefix) of local DNS server 118 by local client 102 should not pass through the secure communication tunnel. Accordingly, when local client 102 sends a DNS lookup request to local DNS server 118, the DNS lookup request will be sent directly to local DNS server 118 over network 120 rather than first traveling through the secure communication tunnel with internal gateway 116 residing in internal network 108. This may avoid the risk that the host name of the DNS lookup request will not be resolved (e.g., when local DNS server 118 is configured to provide addresses for particular hosts 110 only if the DNS lookup requests come from within local network 104). In addition, local DNS server 118 may not be routable from internal network 108 because local network 104 and internal network 108 may assign overlapping private addresses to their respective components.

External network 106 represents any suitable network operable to couple internal network 108 to local network 104. External network 106 may include one or more smaller networks, such as network 126. Network 126 of external network 106 represents any suitable network operable to facilitate communication between the components of external network 106, such as hosts 122, gateways 114 and 116, and external DNS server 124. Network 126 may include any interconnecting system capable of transmitting audio, video, signals, data, messages, or any combination of the preceding. Network 126 may include all or a portion of a public switched telephone network (PSTN), a public or private data network, a local area network (LAN), a metropolitan area network (MAN), a wide area network (WAN), a local, regional, or global communication or computing system network, such as the Internet, a wireline or wireless network, an enterprise intranet, or any other suitable communication link, including combinations thereof, operable to facilitate communication between the components of external network 106.

External network 106 may include any suitable number of hosts 122. Host 122 may be a computing device such as a server, network component, personal computer, mobile device, storage device, or other appropriate computing device. Host 122 may include any collection of hardware, software, memory, and/or controlling instructions or logic operable to provide applications or services to other computing devices, such as client 102. Host 122 may be identified by one or more names (such as an FQDN) and one or more addresses (such as an IP address).

External network 106 may further include one or more external DNS servers 124. External DNS server 124 may include any collection of hardware, software, memory, and/or controlling instructions or logic operable to receive DNS queries and provide responses to the queries. For example, external DNS server 124 may receive DNS lookup requests for addresses of hosts 122. As another example, external DNS server 124 may receive a DNS query for a particular domain and provide an authoritative response with the requested address. External DNS server 124 may provide any suitable response to such DNS queries. As examples, external DNS server 124 may communicate a response with an address that corresponds to a name of a host, a response that refers the sender of the query to a different DNS server, or a response indicating that the name specified in the DNS query is unresolvable. In particular embodiments, external DNS server 124 may facilitate a reverse DNS lookup. For example, external DNS server 124 may receive an address of local client 102 and provide a response that includes the name of local client 102.

Local network 104 represents a private network of an entity, such as an individual or organization. In particular embodiments, internal network 108 is owned and/or controlled by the entity and access to local network 104 is controlled by the entity. For example, local network 104 may be an enterprise network or a private home network. Local network 108 includes any suitable number of interconnected local clients 102, hosts 110, networks 120, local DNS servers 118, and local gateways 114.

Local network 104 may include any suitable number of local gateways 114. For example, some embodiments include multiple local gateways 114 that each provide access to and from local network 104. Local gateway 114 may include any collection of hardware, software, memory, and/or controlling instructions or logic operable to separate local network 104 from external network 106. In particular embodiments, local gateway 114 may perform protocol conversion. As an example, local gateway 114 may encapsulate link layer traffic used by local network 104 within internet layer traffic that is sent to external network 106 or decapsulate internet layer traffic received from external network 106 into link layer traffic for local network 104.

Local network 104 may also include any suitable number of local clients 102. A local client 102 is a device capable of communicating with hosts 112, 122, or 110, gateways 114 or 116, or DNS servers 118, 124, or 128. Local client 102 may include any collection of hardware, software, memory, and/or controlling instructions or logic operable to communicate with these other computing devices. For example, local client 102 may be a computing device such as a server, personal computer, mobile device, or other appropriate computing device. In particular embodiments, local client 102 is a portable computing device that may connect to local network 104 through any of various different local gateways 114 depending on the location of local client 102. As an example, local client 102 may execute a software program, such as a VPN client, that facilitates the establishment of a VPN tunnel with local gateway 114 and the use of encrypted communication through the established VPN tunnel.

In particular embodiments, local client 102 is operable to establish a secure communication tunnel with internal gateway 116 and configure internal DNS server 128 as the DNS server to which it sends all initial DNS lookup requests. When local client 102 sends a DNS lookup request including the name of a host 112 of internal network 108 or host 122 of external network 106, internal DNS server 128 may provide an address of the host 112 or host 122. When local client 102 sends a DNS lookup request to internal DNS server 128 including the name of a host 110 of local network 104, it may receive an address of local DNS server 118 in a DNS referral from internal DNS server 128. Local client 102 may then send the DNS lookup request to local DNS server 118 and obtain the address of host 110 from local DNS server 118. In particular embodiments, local client 102 is operable to cache DNS referrals received from internal DNS server 128 such that subsequent DNS lookup requests for some or all of hosts 110 of local network 104 will be sent directly to local DNS server 118 rather than to internal DNS server 128 first.

As depicted in FIG. 1, system 100 includes various devices such as local clients 102; hosts 110, 112, and 122; gateways 114 and 116; and DNS servers 118, 124, and 128. Any of these devices, such as local client 102a, may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein.

The components of the one or more computer systems may comprise any suitable physical form, configuration, number, type, and/or layout. As an example, and not by way of limitation, one or more computer systems may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, one or more computer systems may be unitary or distributed, span multiple locations, span multiple machines, or reside in a cloud, which may include one or more cloud components in one or more networks.

In particular embodiments, a computer system may include a processor, memory, storage, and one or more communication interfaces. As an example, local client 102a comprises a computer system that includes one or more processors 132, memory 134, storage 136, and one or more communication interfaces 144. These components may work together in order to provide functionality described herein.

Processor 132 may be a microprocessor, controller, or any other suitable computing device, resource, or combination of hardware, stored software and/or encoded logic operable to provide, either alone or in conjunction with other components of local client 102a, local client functionality. In some embodiments, local client 102a may utilize multiple processors to perform the functions described herein.

Memory 134 and/or storage 136 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 134 and/or storage 136 may store any suitable data or information utilized by local client 112a, including software embedded in a computer readable medium, and/or encoded logic incorporated in hardware or otherwise stored (e.g., firmware). Memory 134 and/or storage 136 may also store the results and/or intermediate results of the various calculations and determinations performed by processor 132.

Communication interface 140 may be used for the communication of signaling and/or data between local client 102a and one or more networks and/or resources coupled to a network. Each communication interface 140 may send and receive data and/or signals according to a distinct standard such as Asynchronous Transfer Mode (ATM), Frame Relay, an Ethernet based standard (such as an IEEE 802.3 standard), or other suitable standard.

Local network 104 may also include any suitable number of hosts 110. A host 110 may be a computing device such as a server, network component, personal computer, mobile device, storage device, or other appropriate computing device. Hosts 110 may include any collection of hardware, software, memory, and/or controlling instructions or logic operable to provide applications or services to other computing devices, such as hosts 110 or local clients 102. Each host 110 may be identified by a name and an address.

Local network 104 may further include one or more local DNS servers 118. Local DNS server 118 may include any collection of hardware, software, memory, and/or controlling instructions or logic operable to receive DNS lookup requests and provide responses to the requests. For example, local DNS server 118 may receive DNS lookup requests for addresses of hosts 110, 112, or 122. In particular embodiments, local DNS server 118 receives DNS lookup requests specifying names of hosts 110 from local client 102. Local DNS server 118 may provide any suitable responses to DNS lookup requests. As examples, local DNS server 118 may communicate a response with an address that corresponds to a name of a host, a response that refers the sender of the DNS lookup request to a different DNS server, or a response indicating that the name specified in the DNS lookup request is unresolvable.

In particular embodiments, local DNS server 118 includes name to address mappings for one or more hosts 110 of local network 104 that are not stored by external DNS servers 124 or internal DNS servers 128. For example, hosts 110 may have addresses that the organization controlling local network 104 does not want to advertise to the public. In some embodiments, local DNS server 118 provides an address of a host 110 in response to a DNS query from a computing device inside of local network 104 (e.g., local client 102), but does not provide the address if the DNS query comes from outside the local network (e.g., from a component of internal network 108 or external network 106).

Network 120 of local network 104 represents any suitable network operable to facilitate communication between the components of local network 104, such as local clients 102, hosts 110, local DNS server 118, and local gateway 114. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computing system network, such as the Internet, a wireline or wireless network, an enterprise intranet, or any other suitable communication link, including combinations thereof, operable to facilitate communication between the components of local network 104.

Figure 2:
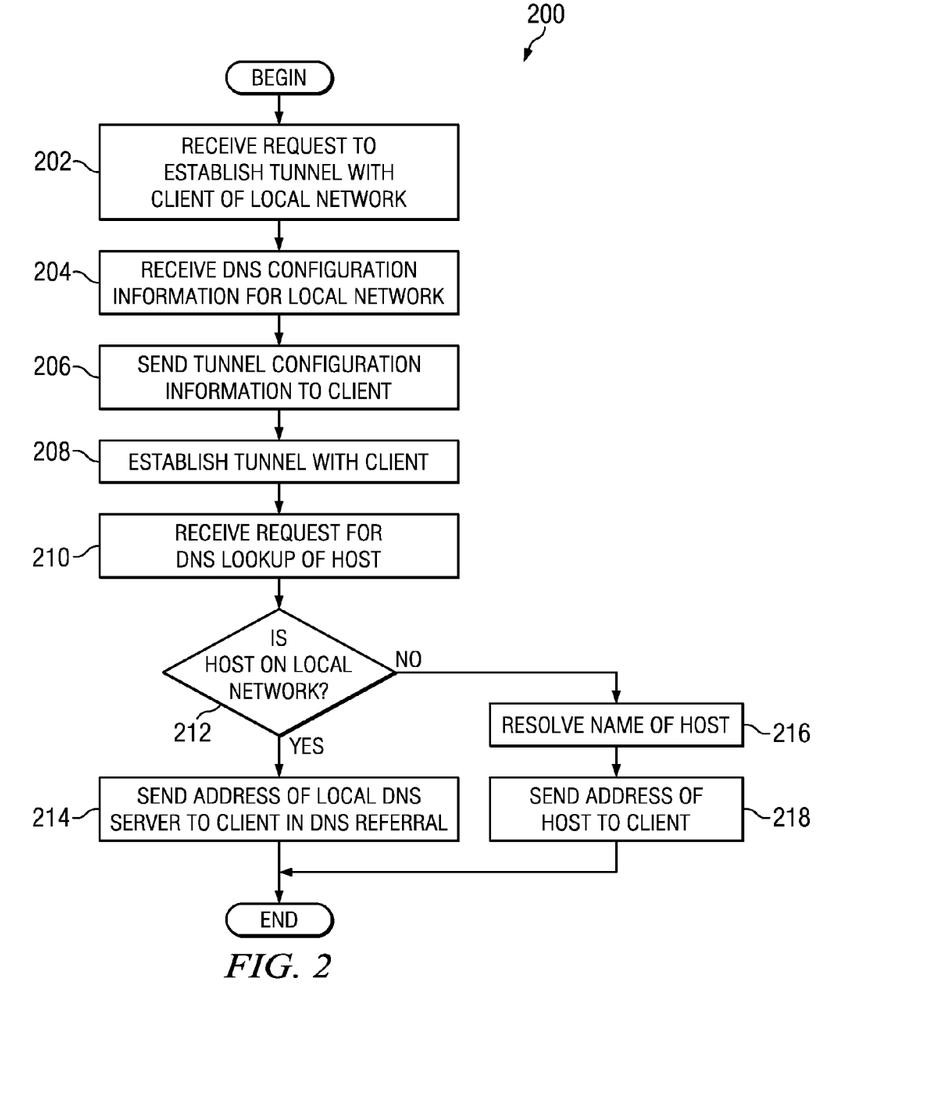
FIG. 2 illustrates an example method for providing split-domain name service that may be performed by the system of FIG. 1.
Figure 3:
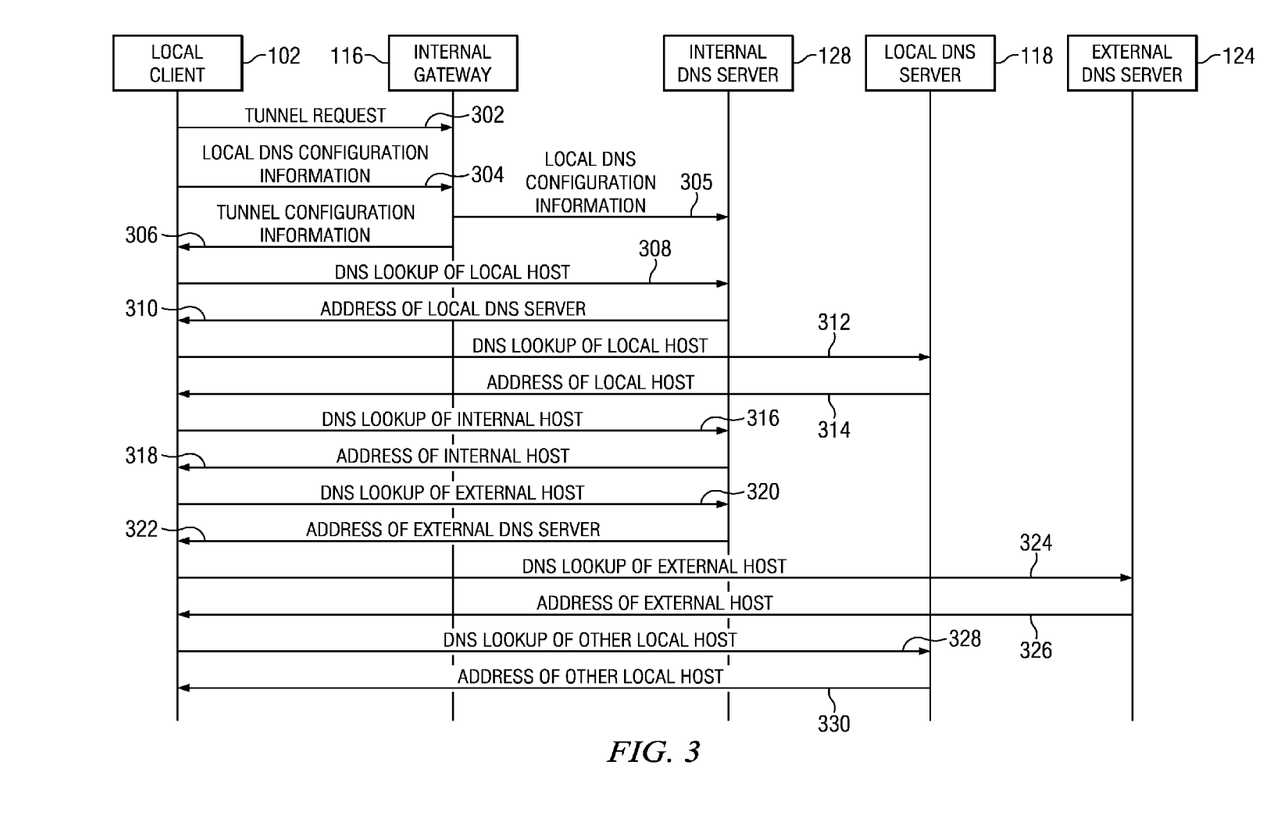
FIG. 3 illustrates an example communication flow of split-domain name service that may be effectuated by the system of FIG. 1.

FIG. 2 illustrates an example method 200 for providing split-domain name service that may be performed by system 100. In particular embodiments, the steps of method 200 may be performed by components of internal network 108 (e.g., internal gateway 116 and/or internal DNS server 128). FIG. 2 will be described in conjunction with FIG. 3, which illustrates an example flow of split-domain name service that may be effectuated by system 100. FIG. 3 depicts various communications that may occur between components of system 100.

Method 200 begins at step 202, where a request to establish a tunnel with a client of a local network is received. For example, as depicted by communication 302, internal gateway 116 may receive a tunnel request from local client 102. The tunnel requested may be a secure communication tunnel such as a VPN tunnel or other tunnel that employs encryption and/or other security features.

At step 204, DNS configuration information for the local network is received. For example, as depicted by communications 304 and 305, internal gateway 116 and internal DNS server 128 may receive local DNS configuration information from local client 102. The local DNS configuration information may include the address of at least one local DNS server 118 of local network 104 that stores name to address mappings for one or more hosts 110 of local network 104. The local DNS configuration information may also include a mapping of the address of local DNS server 118 to one or more domains of local network 104. The DNS configuration information may be provided to internal gateway 116 and internal DNS server 128 at any appropriate time. For example, as depicted, the information may be provided during setup of a secure communication tunnel between local client 102 and internal gateway 116. As another example, an individual associated with local network 104 may communicate the information to an individual associated with internal network 108. That individual may then configure internal gateway 116 and internal DNS server 128 with this information. As yet another example, a reverse DNS lookup may be performed on an address of local client 102 in order to ascertain the DNS configuration information.

At step 206, tunnel configuration information is sent to the client. For example, as depicted by communication 306, tunnel configuration information may be sent from internal gateway 116 to local client 102. The tunnel configuration information may include any suitable information that facilitates communication through a tunnel between local client 102 and internal gateway 116. As an example, the tunnel configuration information may include a temporary IP address for the local client 102 to use when accessing components within internal network 108, and the address of internal DNS server 128. In addition, the tunnel configuration information might also include the address of local DNS server 118 and an indication that traffic sent from local client 102 to that address should not be sent through the tunnel.

At step 208, a tunnel is established with client 208. For example, internal gateway 116 may establish a secure communication tunnel (e.g., a VPN tunnel) with local client 102. At step 210, a request for a DNS lookup of a host is received. For example, internal DNS server 128 may receive a request for a DNS lookup of a host from local client 102 via internal gateway 116. Communications 308, 316, and 320 depict DNS lookup requests for a host 110 of local network 104, a host 112 of internal network 108, and a host 122 of external network 106 respectively.

At step 212, it is determined whether the host specified in the DNS lookup request is a member of local network 104. As an example, internal DNS server 128 may store one or more host names or domain names that identify hosts 110 of local network 104. Internal DNS server 128 may also include a mapping of these host names or domain names to an address of local DNS server 118. Thus, if the host specified in the DNS lookup request is not one of the host or domain names stored by internal DNS server 128, this suggests that the host specified in the DNS lookup request is not a member of local network 104. If it is determined at step 212 that the host identified in the DNS lookup request is a member of the local network, then the address of a DNS server of the local network is provided to the client at step 214 and the method ends. For example, as depicted by communication 310, internal DNS server 128 may send an address of local DNS server 118 to local client 102. In particular embodiments, the address of local DNS server 118 may be sent in a DNS referral message from internal DNS server 128 to local client 102.

After receiving the address of local DNS server 118 from internal DNS server 128, local client 102 may send a DNS lookup request to local DNS server 118 directly in communication 312. Local DNS server 118 resolves the name of the host 110 included in the DNS lookup request and returns the resulting address to local client 102 directly in communication 314. Local client 102 may then use this address to communicate with host 110.

If it is determined at step 212 that the host identified in the DNS lookup request is not on the local network (e.g., internal DNS server 128 does not have a mapping of the name of the host to the address of local DNS server 118), then the name of the host is resolved at step 216 and an address of the host is sent to the client at step 218 as the method ends. As an example, in communication 316, a DNS lookup request for a host 112 of internal network 108 is sent to internal DNS server 128. Internal DNS server 128 may resolve the name of host 112 and return the resulting address of host 112 to local client 102 in communication 318. As another example, in communication 320, a DNS lookup request for a host 122 of external network 106 is sent to internal DNS server 128. In communication 322, internal DNS server 128 sends an address of external DNS server 124 in a DNS referral message to local client 102. After receiving the address of external DNS server 124 from internal DNS server 128, local client 102 may send a DNS lookup request to external DNS server 124 in communication 324. External DNS server 124 resolves the name of the host 122 included in the DNS lookup request and returns the resulting address to local client 102 in communication 326. Local client 102 may then use this address to communicate with host 122. As an alternative to communications 322, 324, and 326, internal DNS server 128 may, in response to communication 320, resolve the name of host 122 using a cached response from a previous DNS query and return the resulting address of host 122 to local client 102.

In particular embodiments, local client 102 is operable to cache the DNS referral received in communication 310. Accordingly, when local client 102 needs an address of a different host 110 of the local network 104, local client 102 may send a DNS request directly to local DNS server 118, instead of sending the DNS request to internal DNS server 128 first. This is depicted in communication 328. The local DNS server 118 resolves the name of the requested host 110 and sends the address of the host 110 back to local client 102 in communication 330.

Particular embodiments may repeat the steps of the method of FIG. 2 and/or the communications of FIG. 3, where appropriate. Moreover, although this disclosure describes and illustrates particular steps of the method of FIG. 2 and the communications of FIG. 3 as occurring in a particular order, this disclosure contemplates any suitable steps of the method of FIG. 2 and the communications of FIG. 3 occurring in any suitable order. Furthermore, although this disclosure describes and illustrates particular components, devices, or systems carrying out particular steps of the method of FIG. 2 and the communications of FIG. 3, this disclosure contemplates any suitable combination of any suitable components, devices, or systems carrying out any suitable steps of the method of FIG. 2 and any suitable communications of FIG. 3. In addition, although FIG. 1 illustrates local network 104, external network 106, and internal network 108, the terms "local", "external", and "internal" are relative and mainly used for clarification purposes. In general, a client may be authorized to access resources on two or more private networks. The client may be a member of the first private network and is able to tunnel to the other private network or networks. The client may use the method illustrated in FIG. 2 for DNS lookup of members on all private networks.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising performing the following by a domain name service (DNS) server of a first network:
    receiving a network address of a DNS server of a second network, the second network coupled to the first network through a first gateway between the second network and a third network and a second gateway between the third network and the first network;
    receiving a request from a client of the second network for a DNS lookup of a name of a host;
    determining whether the host is on the second network; and
    if the host is on the second network:
        sending a DNS referral to the client that includes the network address of the DNS server of the second network, the DNS server of the second network being operable to provide the network address of the host of the second network to the client in response to a DNS lookup request of the name of the host from the client,
    wherein the first gateway is operable to:
    establish a secure communication tunnel with the client of the second network, the secure communication tunnel extending from the first gateway through the third network and the second gateway to the client; and notify the client that requests to the network address or a network prefix covering the network address of the DNS server of the second network should not pass through the secure communication tunnel.

2. The method of claim 1, further comprising:
if the host is not on the second network:
  determining a network address of the host based on the name of the host; and
  sending, to the client of the second network, the network address of the host.

3. The method of claim 1, wherein the network address of the DNS server of the second network is received from the client during the establishment of a secure communication tunnel between the client and the first network.

4. The method of claim 1, wherein the network address of the DNS server of the second network is configured at the DNS server of the first network by an administrator of the first network.

5. The method of claim 1, wherein the network address of the DNS server of the second network is determined based, at least in part, on a reverse DNS lookup of a network address of the client.

6. The method of claim 1, further comprising storing the network address of the DNS server of the second network in a DNS zone file and distributing the DNS zone file to at least one additional DNS server of the first network.

7. The method of claim 1, the determining whether the host is on the second network comprising:
  receiving a domain name that refers to at least a portion of the second network;
  associating the domain name with the network address of the DNS server of the second network; and
  determining whether the host is a member of a domain specified by the domain name.

8. A system comprising:
a DNS server of a first network, the DNS server of the first network operable to:
  receive a network address of a DNS server of a second network, the second network coupled to the first network through a first gateway between the second network and a third network and a second gateway between the third network and the first network;
  receive a request from a client of the second network for a DNS lookup of a name of a host;
  determine whether the host is on the second network; and
  if the host is on the second network:
    send a DNS referral to the client that includes the network address of the DNS server of the second network, the DNS server of the second network being operable to provide the network address of the host of the second network to the client in response to a DNS lookup request of the name of the host from the client,
wherein the first gateway is operable to:
  establish a secure communication tunnel with the client of the second network, the secure communication tunnel extending from the first gateway through the third network and the second gateway to the client; and
  notify the client that requests to the network address or a network prefix covering the network address of the DNS server of the second network should not pass through the secure communication tunnel.

9. The system of claim 8, the DNS server of the first network further operable to:
if the host is not on the second network:
  determine a network address of the host based on the name of the host; and
  send, to the client of the second network, the network address of the host.

10. The system of claim 8, wherein the network address of the DNS server of the second network is received from the client during the establishment of a secure communication tunnel between the client and the first network.

11. The system of claim 8, wherein the network address of the DNS server of the second network is configured at the DNS server of the first network by an administrator of the first network.

12. The system of claim 8, wherein the network address of the DNS server of the second network is determined based, at least in part, on a reverse DNS lookup of a network address of the client.

13. The system of claim 8, the DNS server of the first network further operable to store the network address of the DNS server of the second network in a DNS zone file and distribute the DNS zone file to at least one additional DNS server of the first network.

14. The system of claim 8, the DNS server operable to determine whether the host is on the second network by:
  receiving a domain name that refers to at least a portion of the second network;
  associating the domain name with the network address of the DNS server of the second network; and
  determining whether the host is a member of a domain specified by the domain name.

15. A method comprising:
establishing, by a client of a first network, a secure communication tunnel with a first gateway of a second network, the first gateway of the second network coupled to the first network through a third network and a second gateway of the first network;
receiving, from the first gateway of the second network, an indication that communication with a particular network prefix or particular network address should not be sent through the secure communication tunnel, the particular network prefix covering or particular network address being an network address of a Domain Name Service (DNS) server of the first network;
sending a request through the secure communication tunnel to a DNS server of the second network for a DNS lookup of a name of a host of the first network;
receiving, from the DNS server of the second network, a DNS referral that includes the network address of a DNS server of the first network;
sending the request for the DNS lookup of the name of host of the first network to the network address of the DNS server of the first network; and
receiving, from the DNS server of the first network, a network address of the host of the first network.

16. The method of claim 15, further comprising sending, by the client, the network address of the DNS server of the first network to the DNS server of the second network prior to receiving the network address of the DNS server of the first network in the DNS referral from the DNS server of the second network.

17. The method of claim 15, further comprising sending, by the client, a domain name to be associated with the network address of the DNS server of the first network, the domain name specifying a domain that includes a plurality of hosts of the first network.

18. The method of claim 15, wherein the request for the DNS lookup of the name of the host of the first network is sent to the DNS server of the first network through a path that does not include the secure communication tunnel while the secure communication tunnel is open.

19. The method of claim 15, wherein the host of the first network is a first host and the method further comprises:
   caching the network address of the DNS server of the first network received in the DNS referral in a cache of the client; and
   sending a request for a DNS lookup of a name of a second host of the first network to the network address identified in the cache of the client without first requesting a DNS lookup of the name of the second host from the DNS server of the second network.

20. One or more computer-readable non-transitory storage media embodying logic that is operable when executed by a client of a first network to:
   establish a secure communication tunnel with a first gateway of a second network, the first gateway of the second network coupled to the first network through a third network and a second gateway of the first network;
   receive, from the first gateway of the second network, an indication that communication with a particular network prefix or particular network address should not be sent through the secure communication tunnel, the particular network prefix covering or particular network address being a network address of a Domain Name Service (DNS) server of the first network;
   send a request through the secure communication tunnel to a DNS server of the second network for a DNS lookup of a name of a host of the first network;
   receive, from the DNS server of the second network, a DNS referral that includes the network address of the DNS server of the first network;
   send the request for the DNS lookup of the name of the host of the first network to the network address of the DNS server of the first network; and
   receive, from the DNS server of the first network, an network address of the host of the first network.

* * * * *